O. A. FORS.
COLOR CHART.
APPLICATION FILED OCT. 28, 1911.
1,041,765.
Patented Oct. 22, 1912.
2 SHEETS—SHEET 1.
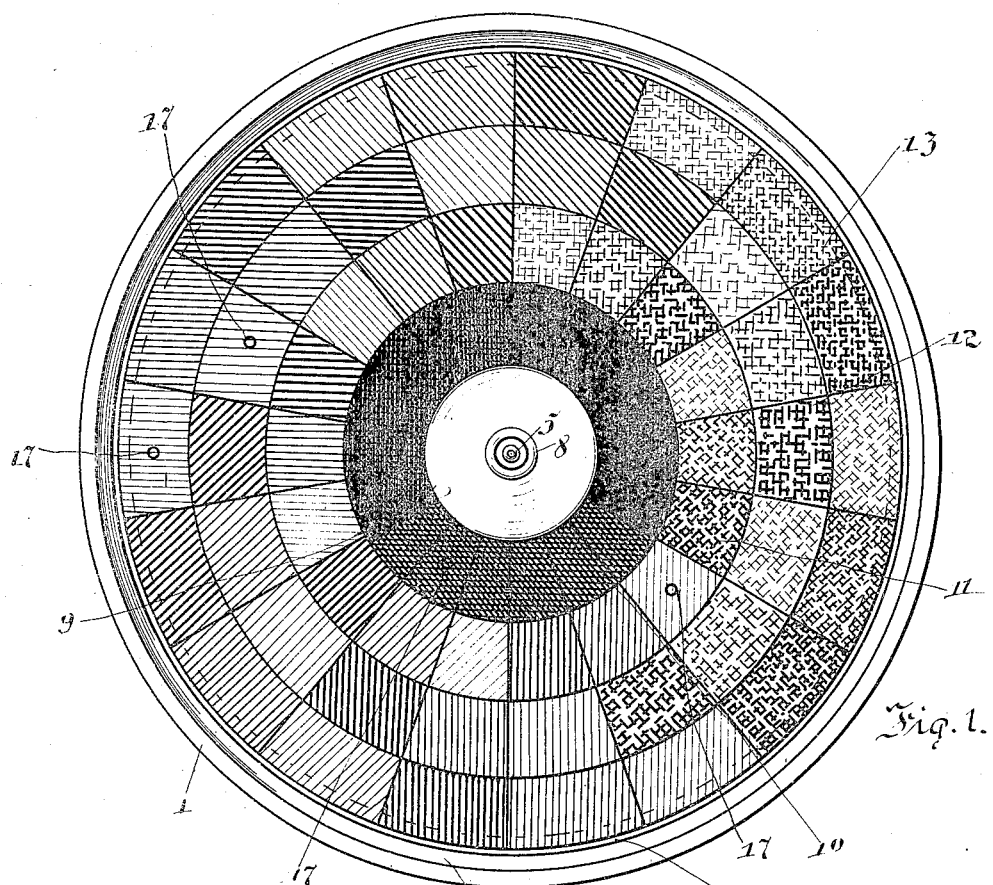
Fig. 1.
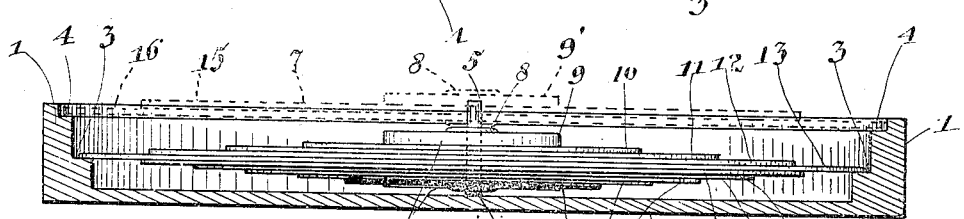
Fig. 2.
Fig. 3.
Witnesses
W. T. Smith
B. G. Richards
Inventor
Oscar A. Fors,
by Joshua R. H. Potts
his Attorney

O. A. FORS.
COLOR CHART.
APPLICATION FILED OCT. 28, 1911.

1,041,765.

Patented Oct. 22, 1912.

2 SHEETS—SHEET 2.

Witnesses
W. J. Smith
B. J. Richards

Inventor
Oscar A. Fors
by Joshua R. H. Potts
his Attorney

UNITED STATES PATENT OFFICE.

OSCAR A. FORS, OF CHICAGO, ILLINOIS.

COLOR-CHART.

1,041,765.  Specification of Letters Patent.  Patented Oct. 22, 1912.

Application filed October 28, 1911. Serial No. 657,344.

*To all whom it may concern:*

Be it known that I, OSCAR A. FORS, a citizen of the United States, and a resident of the city of Chicago, county of Cook, and State of Illinois, have invented certain new and useful Improvements in Color-Charts, of which the following is a specification.

My invention relates to improvements in color charts and more particularly to a chart or device for finding harmonic colors or color combinations for the use of artists, decorators, painters, and others desiring a simple and convenient means for facilitating the selection of color or tint combinations.

The object of the invention is to provide a color chart of this character which shall be simple of construction and efficient in operation.

The invention consists in the combinations and arrangements of parts all as will be hereinafter described and claimed.

Figure 4:
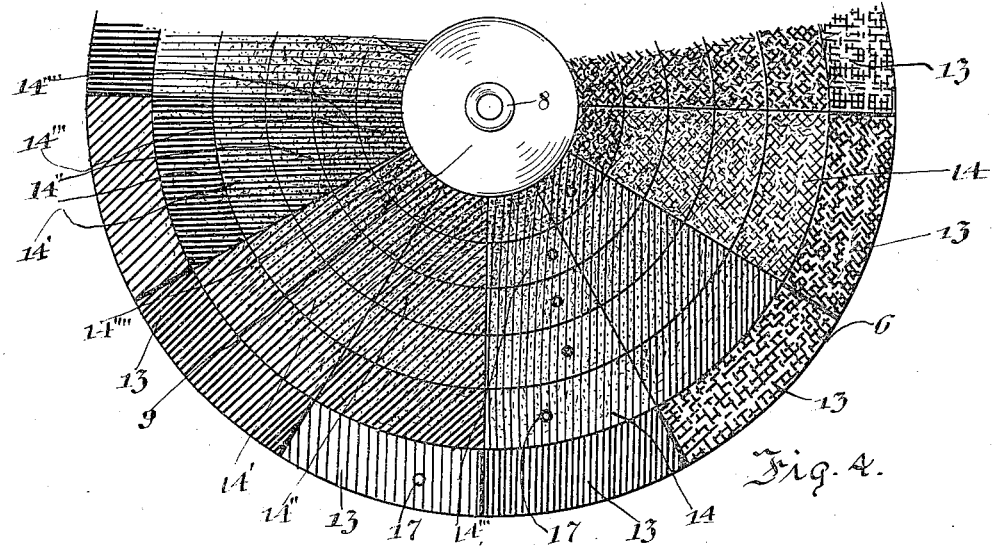
Figure 5:
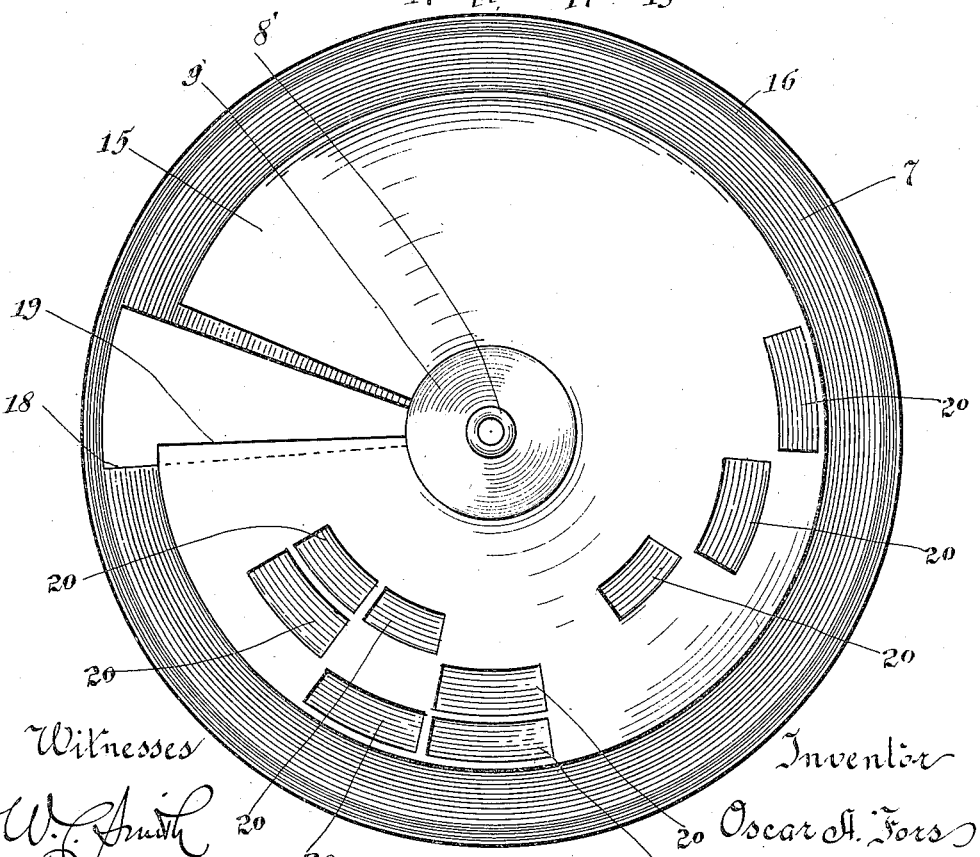

The invention will be best understood by reference to the accompanying drawings forming a part of this specification, and in which, Figure 1 is a top plan view of a color chart and mounting therefor embodying my invention, Fig. 2 is a central vertical section of said mounting showing the chart mounted thereon, Fig. 3 is a detail central section of the chart, Fig. 4 is a bottom plan view of the chart as shown in Fig. 1, and Fig. 5 is a plan view of a mask used in combination with said chart.

The preferred form of construction as illustrated in the accompanying drawings comprises a circular mounting 1 having a disk base 2 and a pair of circular steps 3 and 4 serving as supports for the color chart and mask therefor respectively. A central pin 5 is provided on the base 2 to serve as a journal for rotating the chart 6 and mask 7. The chart 6 is composed of a plurality of disks which are secured together in operative relation by means of a thimble or eyelet 8 and about which said disks are adapted for independent rotation. The ends of the eyelet 8 are turned over or riveted on circular knobs 9 by means of which the chart is readily handled in placing the same on the pin 5. Disks 10, 11, 12 and 13 of the chart 6 are of increasing size, or so formed that the peripheries of said disks are all visible when positioned on the thimble 8. The independently rotatable disks 14, 14', 14'', 14''', 14'''' arranged under the disk 13 and constituting the under side of the chart 6 bear broken colors as will be described hereinafter. The top side of the chart 6 as shown in Fig. 1 bears primary and secondary colors and intermediate shades, except the central disk 10 which bears tertiary colors as shown in Fig. 1.

The mask 7 consists of two independently rotatable disks 15 and 16, the former being of smaller size than the latter in order that the peripheries of both disks shall be rendered visible. In order to readily rotate the several color disks independently of each other, a small perforation 17 is provided in each disk for the reception of a pencil or other small tool adapted for this purpose.

As aforesaid, the lower side of the color chart 6 bears broken colors except disk 13 which bears pure colors. In order to select desired combinations of colors from this portion of the chart, the several disks may be so rotated that the desired tints or colors shall come into close relation or in the same radius of the chart. If the desired combination cannot be found in this manner the mask 7 is resorted to which is placed over the chart as shown in Fig. 4, as indicated by dotted lines in Fig. 2. It is understood that when the mask 7 is placed over the chart 6 for comparing the colors as shown in Fig. 4, that said chart is so placed on the pin 5 that the lower side thereof as shown in Fig. 2 shall be uppermost. Having thus arranged the chart 6 and the mask 7 thereon, the desired colors may now be selected by rotating the mask 7 upon the chart. The disk 17 of the mask 7 comprises a segmental opening 18 which is adapted to render visible any sector of the chart as shown in Fig. 4. The disk 15 is provided with a segmental opening 19 in its periphery adapted for juxtaposition or registration with the segment 18 and thereby render the latter operative. By rotating the mask 7 upon the chart as shown in Fig. 4 with the openings 18 and 19, as illustrated in Fig. 5 any desired sector of said chart will be rendered visible. If the desired colors are not adjacent in the sectors as thus rendered visible, then the disk 15 is so rotated as to cover all the sectors of the chart excepting those borne by the disk 13. A color having been selected on the latter disk, then the disk 15 is so rotated that other colors may be exposed, there being a plurality of segmental openings 20 provided in the disk 15 and staggered about the surface thereof which are adapted to expose portions of the chart sectors at varying distances from the center pin 5.

It will be seen that when the openings 20 at the left of the mask 7 is brought into registration with the opening 18 that two colors or tints will be exposed to view on the disk 14, the one at the periphery thereof being concealed. If the colors thus exposed are not satisfactory then the disk 15 may be so rotated that the next two openings 20 at the right shall be in registration with the opening 18, it being clear that by thus rotating the disk 15 that the portion of the disk 14 which was concealed will now be brought into view. By further rotating the disk 15 other combinations will be brought to view by means of the other segmental openings 20. In this manner a large number of combinations of broken colors shown on the chart as illustrated in Fig. 4 may be compared. The mask 7 is readily rotated by means of the knob 9' provided thereon and it is secured to the disks 15 and 16 by means of the eyelet or thimble 8'.

The color chart as illustrated in Fig. 1 comprises primary, secondary and intermediate colors on the peripheries of the disks 11, 12 and 13 as aforesaid. In order to select a combination of colors for any particular purpose, one color is first selected in the periphery of the disk 13. Then the disk 12 is so rotated relatively to the disk 13 as to bring the colors into successive registration with the color already selected. After a color has been chosen to combine with the first chosen color then the same is placed in the same radius and allowed to remain there until another color has been chosen. The third color is chosen by rotating the disk 11 in a manner similar to that of the disk 12, the desired combination being in this manner brought into the same radius or sector of the chart. The colors are so arranged upon the several disks that when a certain harmonic value has been reached in one sector that the same harmonic value obtains in the other sectors. Thus if the colors exposed in one sector do not meet the requirements then the operator has the assurance that the same harmonic relation or value is presented in the other sectors so that any one of the other sectors may be chosen if desired.

The mode of operation is as follows: Assuming that a color combination having yellow as one of the colors desired and that the other colors of the desired combination are remote from yellow on the chart; then assuming that the other colors are red, purple and green, all that is necessary is to so rotate the disks that the desired shades of these colors shall be brought into the same radius or sector of the chosen yellow. In this manner the colors are readily compared. Whatever the harmonic value or relation of the colors thus chosen may have the other colors of the several sectors of the chart will have the same comparative value. An example of three color comparison consists in first selecting some shade of red in the large disk 13 as shown in Fig. 4. Then select a broken color from some other sector on the chart, and then another from another radius or sector. Place the mask 7 over the chart and rotate the same until the segmental opening 18 registers with the chosen shade of red. Then the disk 15 of the mask 7 is so rotated that any one of the three pair of segmental openings 20 shall be brought into juxtaposition with the opening 18. In this manner all possible combinations are brought to view. For four color comparison the employment of the openings 20 is not necessary, the only requirement being that the segmental notch or opening 19 shall be brought into registration with the opening 18, whereupon all four colors of all sectors of the chart may be readily compared.

A color chart as set forth is simple of construction, and efficient in operation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A color chart comprising a plurality of varying sized concentric rotatable disks bearing a plurality of color sectors on the exposed portions thereof; and a rotatable mask having a plurality of segmental openings therein, said openings being located in different sectors and at different distances from the center of rotation, substantially as described.

2. A color chart comprising a plurality of varying sized concentric rotatable disks bearing a plurality of color sectors on the exposed portions thereof; a rotatable mask having a plurality of segmental openings therein; said openings being located in different sectors and at different distances from the center of rotation, and a rotatable disk under said mask and provided with an opening therein adapted to expose a sector on each of said disks, substantially as described.

3. A color chart comprising a circular base, an axial pin projecting from said base, a series of independently rotatable disks secured together and mounted for rotation upon said pin, said disks being of varying size and bearing a plurality of sectors of different colors on the peripheries thereof, and a perforated mask adapted to be superimposed on said disks and adapted for free rotation upon said pin, said mask being provided with a plurality of openings therein, said openings being located in different sectors and at different distances from the center of rotation, substantially as described.

4. A color chart comprising a circular base having an axial pin projecting therefrom, a pair of circular steps arranged coaxially with said pin and suitably arranged on the periphery of said base, a series of varying sized disks secured together and adapted to rotate upon said pin, the periphery of the larger of said disks being adapted to seat on one of said steps, and a circular perforated mask mounted for free rotation upon said pin and adapted to seat on the other of said steps, substantially as described.

5. A color chart comprising a circular base having a peripheral wall, a central pin projecting upwardly from said base, there being a pair of circular steps provided on the interior of said peripheral wall, a series of disks of varying size secured together and mounted for free rotation upon said pin, the periphery of the larger of said disks being adapted to seat on one of said steps, said disks being mounted for independent rotation, and a rotatable perforated mask mounted upon said pin and adapted to seat on the other of said steps, substantially as described.

6. A color chart comprising a circular base having a peripheral wall, there being a pair of circular steps provided on the interior of said wall, an axial pin projecting upwardly from said base, a series of varying sized disks secured together for independent rotation and mounted upon said pin, the periphery of the larger of said disks being adapted to seat on one of said steps, a perforated mask mounted for rotation upon said pin and adapted to seat on the other of said steps, and means for rotating said disks and mask, substantially as described.

7. A color chart comprising a circular base having an axial pin projecting upwardly therefrom, a series of disks of varying size and bearing a plurality of sectors of different colors in the peripheries thereof, means for securing said disks together in such a manner as to permit of independent rotation thereof, there being a perforation formed adjacent the periphery of each disk whereby the same is rotated, and a mask consisting of a circular disk mounted for free rotation upon said pin, and a smaller disk secured in operative relation with the perforated mask disk and having a plurality of segmental openings formed therein, substantially as described.

8. A color chart comprising a base, a pin projecting axially from said base, a series of varying sized disks mounted for independent rotation upon said pin and bearing exposed color sectors in the periphery thereof, means for securing said disks together to permit of independent rotation thereof, and a rotatable mask adapted to be superimposed on said disks and having a plurality of segmental opening therein for exposing and concealing different portions of the sectors of said disks, said openings being located in different sectors and at different distances from the center of rotation, substantially as described.

9. A color chart comprising a base, an axial pin projecting from said base, a plurality of varying sized disks bearing a plurality of color sectors in the peripheries thereof, said disks being mounted for independent rotation upon said pin, means for holding said disks in operative relation, a mask comprising two disks of different size adapted to be superimposed upon said color disks and mounted for free rotation upon said pin, there being a segmental opening in one of the disks of said mask, and a plurality of segmental openings in the other of said disks, substantially as described.

In testimony whereof I have signed my name to this specification in the presence of two subscribing witnesses.

OSCAR A. FORS.

Witnesses:
 JOSHUA R. H. POTTS,
 HELEN F. LILLIS.